(12) United States Patent
Schilling et al.

(10) Patent No.: US 9,550,651 B2
(45) Date of Patent: Jan. 24, 2017

(54) COIL SUPPORT FOR A TRIMMER LINE COIL

(71) Applicant: Andreas Stihl AG & Co. KG, Waiblingen (DE)

(72) Inventors: Thorsten Schilling, Virginia Beach, VA (US); Robert Jamieson Pearson, Norfolk, VA (US); Vladimir A. Smagin, Virginia Beach, VA (US); Andreas Garstenauer, Chesapeake, VA (US)

(73) Assignee: Andreas Stihl AG & Co. KG, Waiblingen (DE)

( * ) Notice: Subject to any disclaimer, the term of this patent is extended or adjusted under 35 U.S.C. 154(b) by 367 days.

(21) Appl. No.: 13/785,585

(22) Filed: Mar. 5, 2013

(65) Prior Publication Data

US 2014/0252152 A1 Sep. 11, 2014

(51) Int. Cl.
| | |
|---|---|
| *B65H 75/28* | (2006.01) |
| *B65H 55/02* | (2006.01) |
| *A01D 34/416* | (2006.01) |
| *B65H 49/06* | (2006.01) |
| *B65H 75/44* | (2006.01) |

(52) U.S. Cl.
CPC ............ *B65H 55/02* (2013.01); *A01D 34/416* (2013.01); *B65H 49/06* (2013.01); *B65H 75/285* (2013.01); *B65H 75/4473* (2013.01); *B65H 2701/354* (2013.01)

(58) Field of Classification Search
USPC .................................................. 30/276, 347
See application file for complete search history.

(56) References Cited

U.S. PATENT DOCUMENTS

| 4,250,623 | A | * | 2/1981 | Pittinger et al. ............... 30/347 |
| 4,550,498 | A | | 11/1985 | Oliver | |
| 4,561,180 | A | | 12/1985 | Pittinger et al. | |
| 4,882,843 | A | * | 11/1989 | Baba ........................... 30/276 |
| 4,897,923 | A | * | 2/1990 | Collins ........................ 30/276 |
| 5,193,278 | A | * | 3/1993 | Osakabe et al. .............. 30/276 |
| D524,643 | S | * | 7/2006 | Legrand ...................... D9/415 |
| 8,429,886 | B2 | | 4/2013 | Kato et al. | |
| 8,549,827 | B2 | | 10/2013 | Kato et al. | |
| 2002/0170183 | A1 | * | 11/2002 | Sugihara et al. ............. 30/276 |

(Continued)

FOREIGN PATENT DOCUMENTS

| CN | 101932226 | 12/2010 |
| CN | 102907209 | 2/2013 |

(Continued)

*Primary Examiner* — William A Rivera
(74) *Attorney, Agent, or Firm* — Gudrun E. Huckett (57) ABSTRACT

A coil support with a coil of a trimmer line has a coil core with an outer wall surface and first and second axial ends. At the axial ends securing elements that project past the wall surface of the coil core are provided for positional fixation of the coil wound onto the coil core. A securing element provided at the first axial end is a support plate with a longitudinal center axis. The size of the support plate is provided in the direction of the longitudinal center axis with a greater extension than transverse to the longitudinal center axis such that the support plate in a first radial direction of the coil core is greater than in a second radial direction. The coil core is fixedly connected with the support plate and with the further securing elements that are provided on the second axial end.

21 Claims, 6 Drawing Sheets

(56) References Cited

U.S. PATENT DOCUMENTS

2008/0047148 A1* 2/2008 Proulx ........................ 30/276
2013/0031787 A1   2/2013 Kamiya et al.

FOREIGN PATENT DOCUMENTS

| EP | 1 446 002 B1 | 8/2004 |
|---|---|---|
| JP | H09-121648 | 5/1997 |
| JP | H10-191749 | 7/1998 |
| JP | 3174660 U | 3/2012 |
| WO | 2008/123001 A1 | 10/2008 |

* cited by examiner

COIL SUPPORT FOR A TRIMMER LINE COIL

BACKGROUND OF THE INVENTION

The invention concerns a coil support with a coil of a trimmer line for a trimmer.

EP 1 446 002 B1 discloses a trimmer line mowing head which operates with a trimmer line that is secured by clamping in the cutter head. When a trimmer line is worn, it is exchanged for a new trimmer line section. For this purpose, the user must carry with him a supply coil of trimmer line from which, as needed, he cuts the required length of the trimmer line and inserts it into the cutter head. The supply coil of a trimmer line is carried on a coil support.

U.S. No. D524,643 S discloses a packaging for a coil of a trimmer line that is embodied as a blister pack. The coil of the trimmer line is wound separate from the packaging and is then inserted into the blister pack. This is manually complicated and time-consuming. When a section of the trimmer line is to be removed, the packaging must be opened, the desired length of trimmer line unwound and cut to length, and the packaging must be closed again. In this context, it may happen that the coil will unwind accidentally so that the line becomes entangled and the packaging can no longer be closed.

The object of the invention is to configure a coil support with a coil of a trimmer line for a trimmer in such a way that, on the one hand, the labor expenditure for winding the coil onto the coil support is minimal and, on the other hand, a simple removal of trimmer line sections from the coil support should be possible without the coil automatically unwinding or the trimmer line becoming entangled.

SUMMARY OF THE INVENTION

As a solution to this object, according to the invention a coil support with a coil of a trimmer line for a trimmer is provided wherein the coil has an inner end section of the trimmer line and an outer end section of the trimmer line. The coil support is comprised of a central coil core wherein the coil core has an outer wall surface. The coil core has a first axial end and a second axial end wherein on the axial ends securing elements projecting past the wall surface of the coil core are provided for positional fixation of the coil of the trimmer line wound onto the coil core. On the first axial end of the coil core the securing element is formed by a support plate wherein the support plate has a longitudinal center axis. The size of the support plate is provided with a greater length in the direction of its longitudinal center axis than transverse to its longitudinal center axis in such a way that the support plate in a first radial direction of the coil core is greater than in a second radial direction of the coil core. The coil core is fixedly connected with the support plate and with the additional securing elements which are provided on the second axial end.

The coil support according to the invention has an inner central coil core whose ends have securing elements projecting past the circumference of the coil core and serving for positional fixation of the coil wound onto the coil core. At one end of the coil core, a support plate is provided as a securing element wherein the size of the support plate in at least one radial direction of the coil core is greater than the outer diameter of the coil wound onto the coil core. The coil core, in a special embodiment, is connected fixedly with the support plate so that for winding the trimmer line onto the coil core the support plate rotates together with the coil. In this way, it is possible to easily wind the trimmer line onto the coil support.

On the other end of the coil core, radial flanges are provided as securing elements wherein the coil has an outer coil diameter and the radial flanges project past the outer diameter of the coil of the trimmer line. Expediently, the radial flanges in the circumferential direction of the coil are positioned at a spacing to each other. In this context, a radial flange can have a head section and a base section wherein the base section begins at the level of the wall surface of the coil core.

A radial flange has a head section and a base section wherein, in the head section that forms a free end of a radial flange, at least one clamping opening is formed for an end section of the trimmer line. The trimmer line on the coil support can thus be secured at its loose outer end section in the clamping opening. In this way, an accidental unwinding of the coil from the coil support is counteracted.

Advantageously, in the head section of a radial flange several clamping openings with different dimensions are formed that can be used for trimmer lines with different line diameters. One and the same coil support can therefore be used for trimmer lines of different diameters.

At one axial end of the coil core, a clamping element for securing the inner end section of the trimmer line is provided in the wall surface of the coil core. The clamping element is designed preferably as a clamping tongue that is provided within the circumferential wall of the coil core and has a free end. In particular, the free end of the clamping tongue ends in a window of the support plate.

In a further embodiment of the invention, in the support plate window-like penetrations are provided that immediately adjoin the wall surface of the coil core. In this connection, the penetrations of the support plate and the radial flanges of the coil core are arranged at the same circumferential position on the coil core and have in circumferential direction of the coil core a greater extension than the radial flanges themselves. Viewed in axial direction of the coil core, the radial flanges are positioned above the penetrations so that the coil core, the support plate and the securing elements can be formed as a monolithic component, in particular as a monolithic injection-molded part. The support plate itself is not of rotational symmetry because, in the direction of the longitudinal center axis, it has a greater length than transverse to its longitudinal center axis. When carrying out winding on the spindle of a winding machine, this results in a slight imbalance which however is of subordinate importance and does not constitute a disadvantage. It may be advantageous to compensate the imbalance by appropriate compensation measures on the winding machine.

The coil core itself is preferably of rotational symmetry, in particular it is a coil cylinder while the support plate itself is not embodied to have rotational symmetry.

In order to drive in rotation the coil support, i.e., the monolithic component of support plate, coil core, radial flanges, it is provided that the coil core is hollow and has an inner follower that projects in radial direction inwardly and is preferably embodied as a rib. The rib engages a follower groove of a drive spindle of a winding machine so that in a simple way a rotational connection between the drive spindle and the coil support is provided.

The approximately rectangularly shaped support plate is of such a design that a receiving field for an adhesive label or a similar labeling is formed.

At the rim of the support plate an opening for engagement of a suspension element is formed so that the coil support together with the coil wound onto the coil core can be suspended in a simple way from a carrier for presentation of wares. The opening extends in this connection on both sides of the longitudinal center axis of the support plate and is in particular divided by the longitudinal center axis of the support plate, preferably divided symmetrically.

BRIEF DESCRIPTION OF THE DRAWINGS

Further features of the invention result from the additional claims, the description, and the drawing in which in the following an embodiment of the invention will be explained in detail. It is shown in:

DESCRIPTION OFF THE PREFERRED EMBODIMENTS

Figure 1:
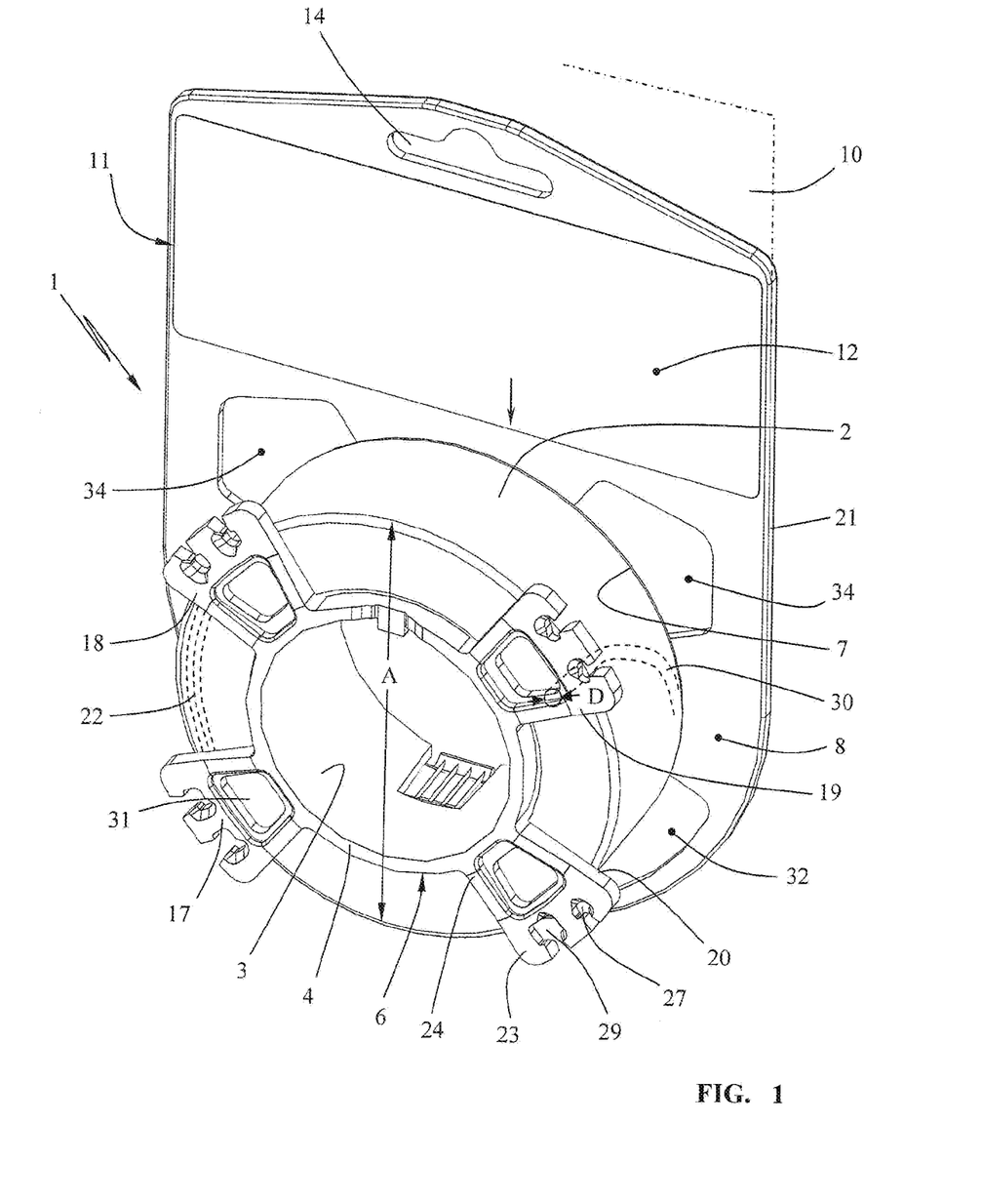
FIG. 1 in a perspective view a coil support according to the invention with a coil of a trimmer line for a trimmer.
Figure 2:
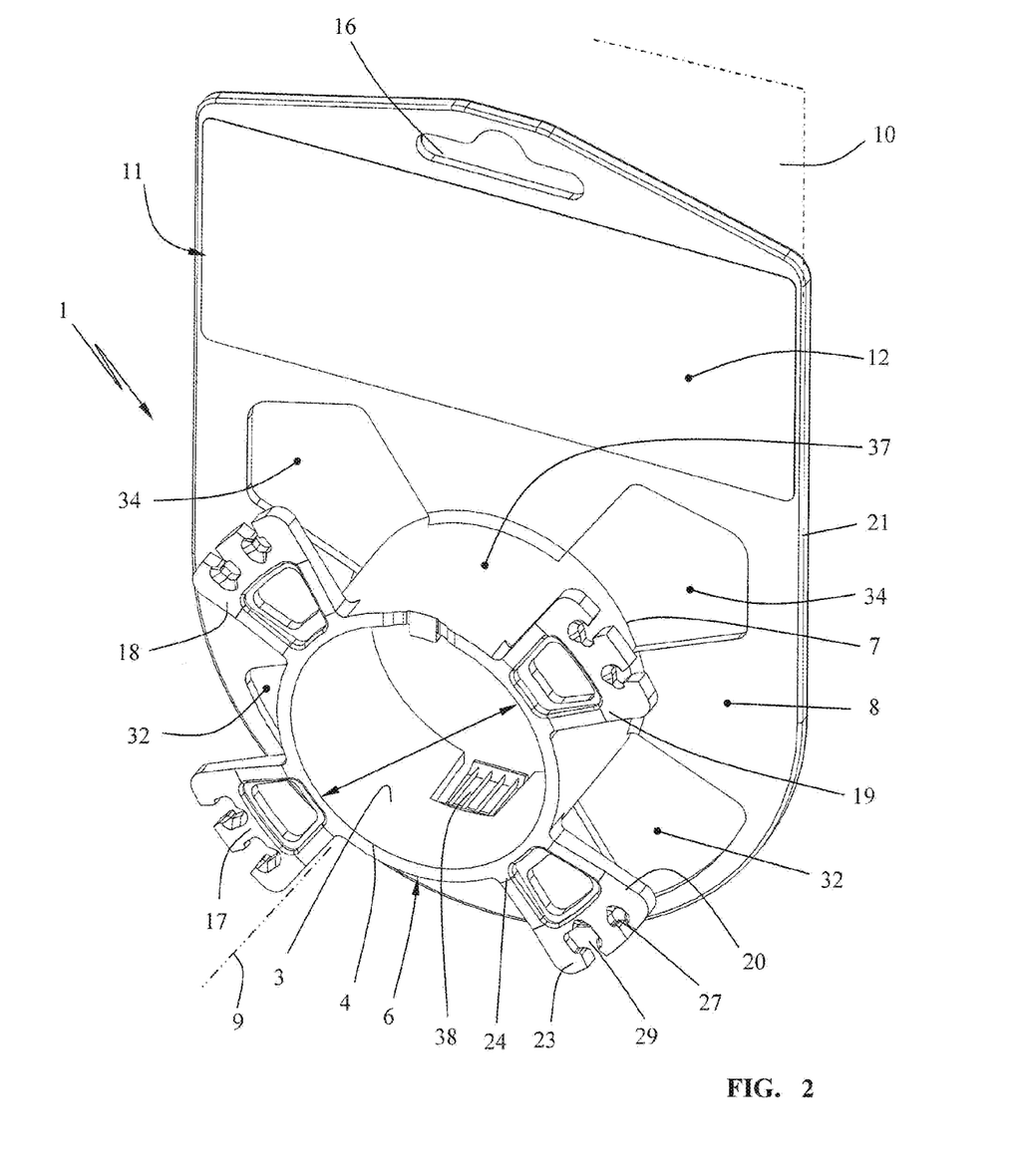
FIG. 2 in a perspective view a coil support according to FIG. 1 without coil.
Figure 6:
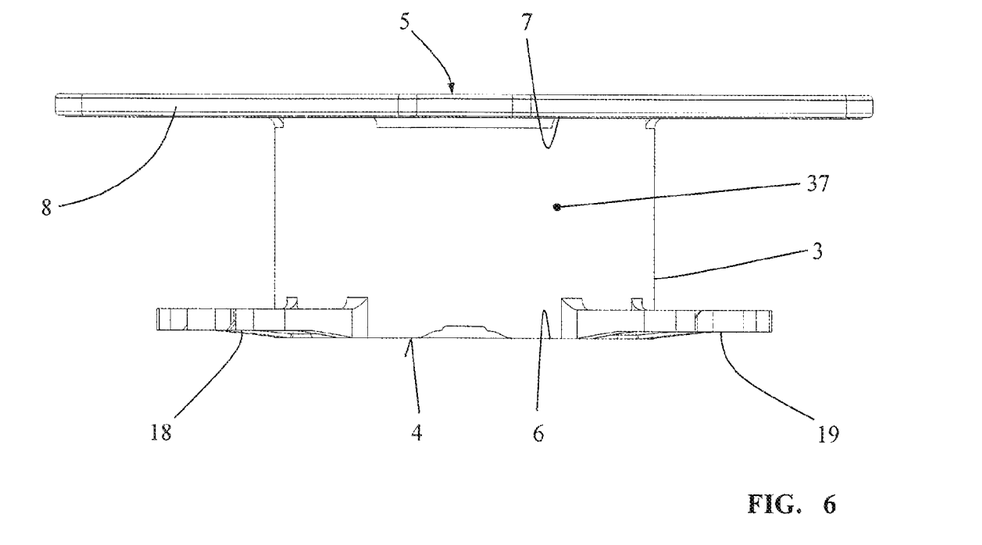
FIG. 6 a view onto the coil support from above.
Figure 7:
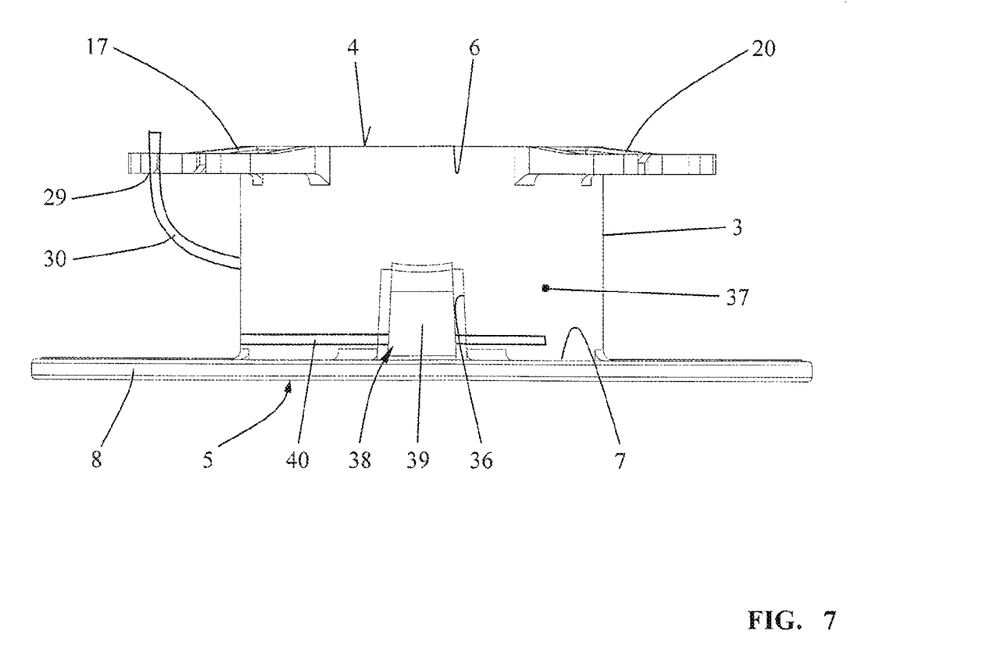
FIG. 7 a view onto the coil support from below.

The coil support 1 illustrated in FIG. 1 is illustrated in FIG. 2 without the coil 2 secured on the coil support. The coil support 1 is comprised substantially of an inner central coil core 3 that is preferably hollow and is open at the end faces 4 and 5 (FIGS. 6, 7). In the illustrated embodiment, the coil core 3 is cylindrically embodied and thus represents a coil cylinder of rotational symmetry.

Figure 3:
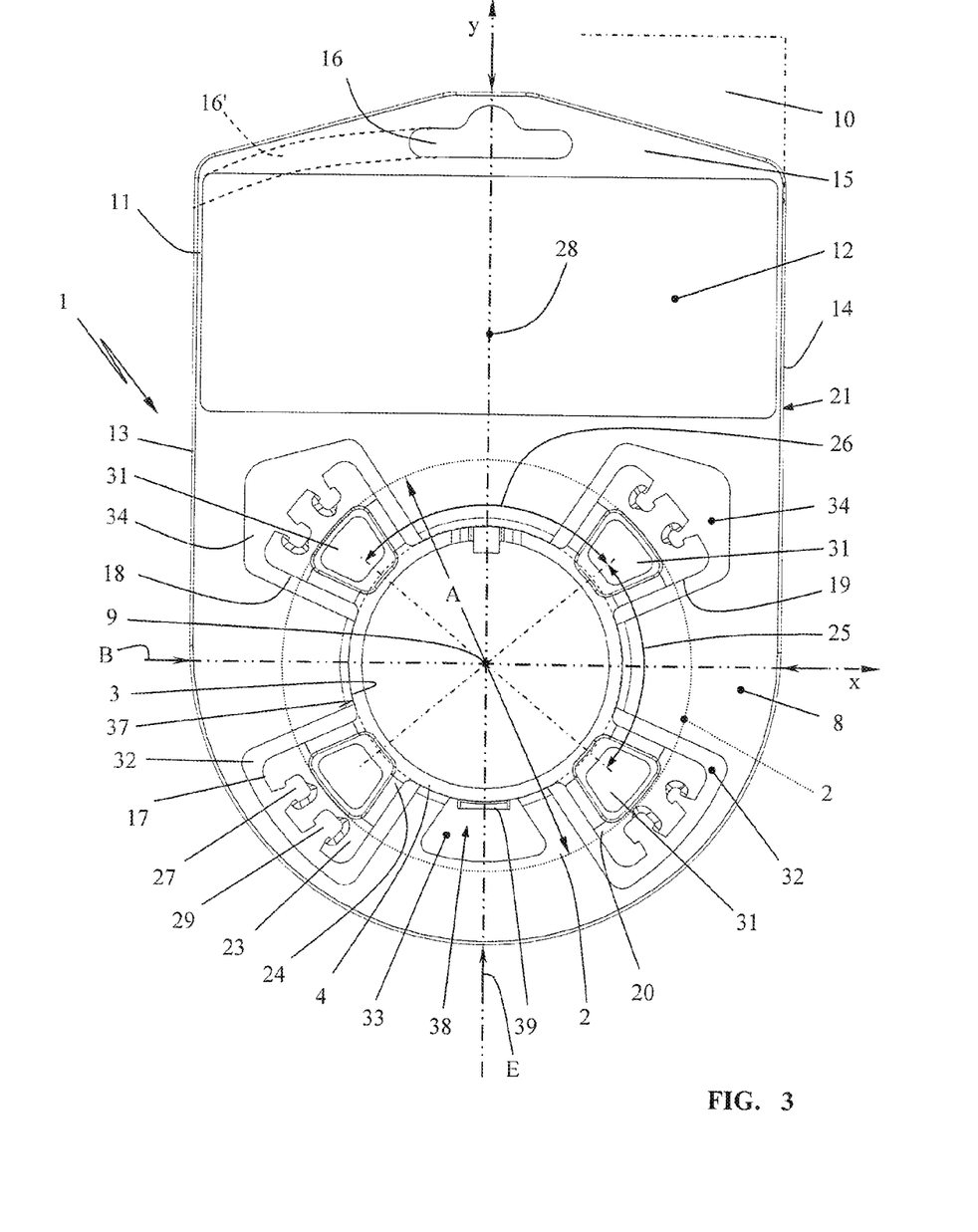
FIG. 3 a view onto the coil support according to FIG. 2 from the front.
Figure 4:
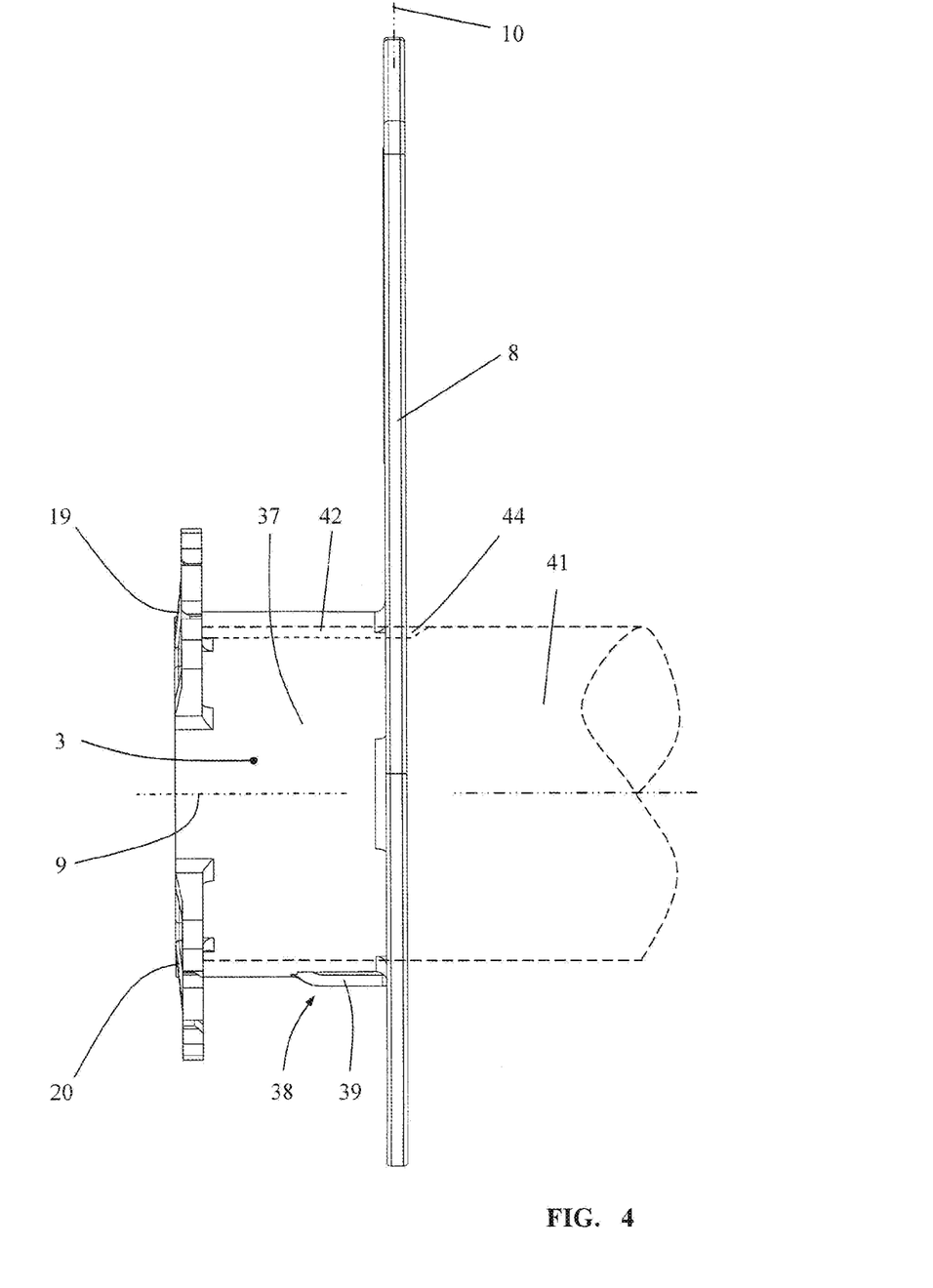
FIG. 4 a side view of the coil support according to FIG. 2 on a drive spindle.

The coil core 3 has a first axial end 7 and a second axial end 6. At the first rearward end 7, a support plate 8 is monolithically formed therewith wherein the longitudinal center axis 9 of the coil core 3 is perpendicular to the plane 10 of the support plate 8. As illustrated in FIG. 3, the plane 10 of the support plate 8 is arranged in an x/y coordinate system whose y axis is formed by the longitudinal center axis 28 of the coil support 1 wherein the longitudinal center axis 28 of the coil support 1 is at the same time the longitudinal center axis 28 of the support plate 8. The z axis of the three dimensional coordinate system is formed by the longitudinal center axis 9 of the coil core 3. In one radial direction of the coil core 3, in the illustrated embodiment in the direction of the y axis, the support plate 8 is greater than the outer diameter A of the coil 2 secured on the coil core 3. The size of the support plate 8 has an extension E (FIG. 3) in the y direction that is greater than the width B (FIG. 3) measured transversely to the longitudinal center axis 28 in the x direction of the support plate 8. As shown in FIG. 3, the support plate 8 is formed below the x axis, i.e. below the longitudinal center axis 9 of the coil core 3, with a semicircular shape wherein the center point of the circle of the round portion is positioned on the longitudinal center axis 9 of the coil core 3. Above the x axis the support plate 8 is substantially embodied of a rectangular to square shape wherein in an area above the coil 2 secured on the coil core 3 a receiving field 11 for specifications of the product is provided, for example, an adhesive label, a labeling field or the like. In the illustrated embodiment, the receiving field 11 is a slightly recessed portion in the support plate 8 wherein the recessed portion 12 is substantially rectangular and extends from one upright edge 13 to the opposite upright edge 14 of the support plate 8. Above the receiving field 11 the support plates 8 ends in a trapezoidal section 15 having at its center an opening 16 for engagement of a suspending element of a presentation means for wares or the like. The opening 16 is designed such that it extends on both sides of the longitudinal center axis 28 of the support plate 8. It may be advantageous to design the opening as a slot 16' which is open relative to the upright edge 13 of the support plate. Such a slot 16' is indicated in dashed lines in FIG. 3.

At the other leading end 6 of the coil core 3 several radial flanges 17, 18, 19, 20 are provided that extend in radial direction outwardly. The support plate 8 and the radial flanges 17, 18, 19, 20 form securing elements for positional fixation of the coil 2 of the trimmer line 22 wound on the coil core 3. As shown in the view of FIG. 3, the radial flanges 17, 18, 19, 20 end inside the outer rim 21 of the support plate 8. As shown furthermore in the Figures, the support plate 8 is not formed with rotational symmetry relative to the longitudinal center axis 9 of the coil core 3 but has in the direction of its longitudinal center axis 28 a greater extension E than transversely to its longitudinal center axis 28. Relative to the x/y coordinate system of the embodiment, the extension of the support plate 8 above the x axis is more than 1.5 times as large as below the x axis. Advantageously, the extension above the x axis is more than twice as large as below the x axis.

Figure 5:
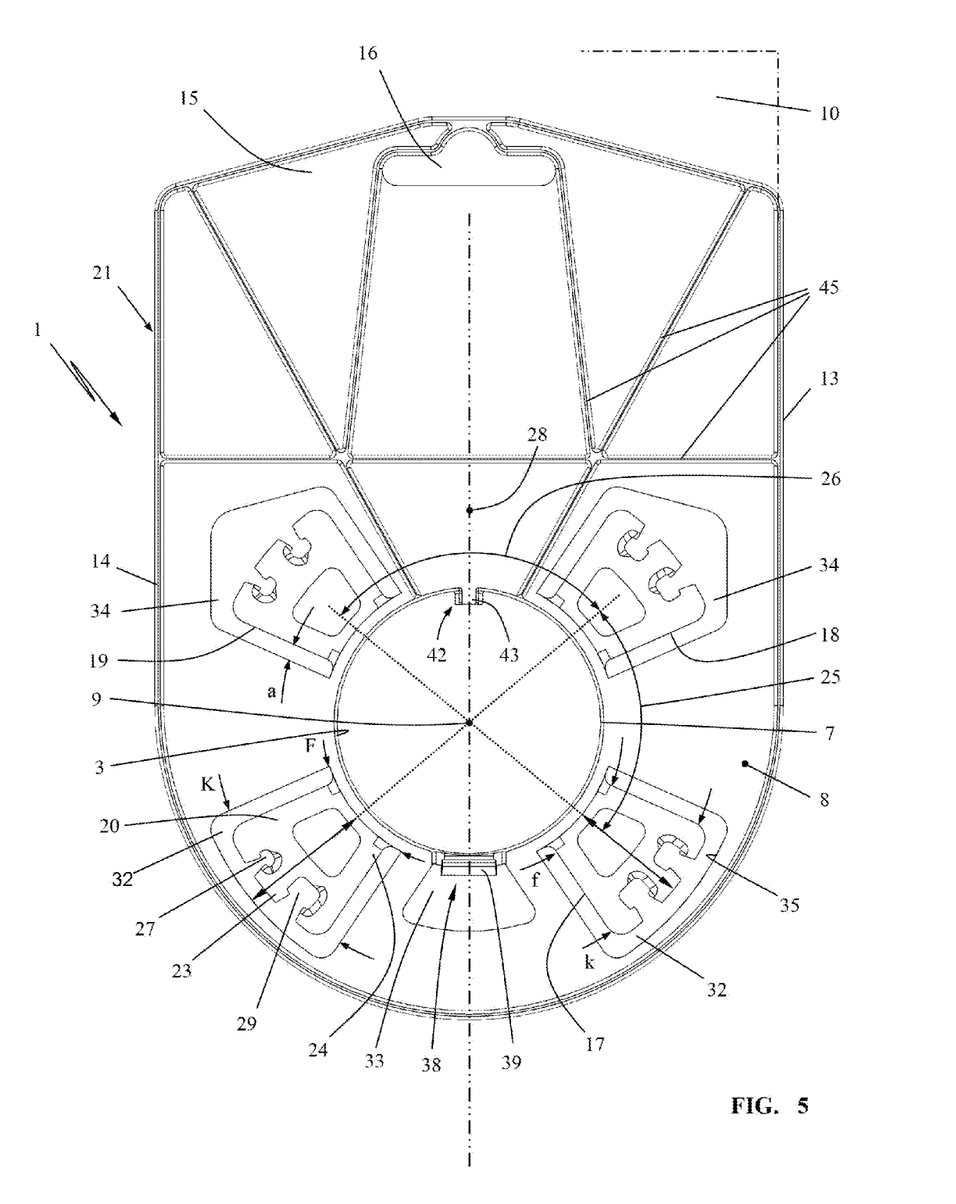
FIG. 5 a view onto the coil support according to FIG. 3 from the rear.

Each radial flange 17, 18, 19, 20 has a head section 23 that is wider than the base section 24. As illustrated in FIG. 5, the head section 23 has a width k which, measured in the circumferential direction of the coil core 3, is greater than the width f of the base section. In the illustrated embodiment, the head section 23 has approximately 1.5 times the width f of the base section 24 of the radial flange.

About the circumference of the coil core 3, several radial flanges 17, 18, 19, 20 are provided wherein the radial flanges in the circumferential direction of the coil core 3 are positioned at a spacing to each other. In the illustrated embodiment, four radial flanges 17, 18, 19, 20 are positioned in pairs diametrically opposed to each other relative the longitudinal center axis 9 of the coil core 3. The arrangement is such that a radial flange has different angular spacings relative to its neighboring flanges in the circumferential direction. In the illustrated embodiment, the radial flange 17 has relative to the radial flange 18 a circumferential spacing 25 of 80 degrees while the radial flange 18 relative to the radial flange 19 has a circumferential spacing of 100 degrees. Accordingly, the radial flange 19 relative to the radial flange 20 has a smaller circumferential spacing 25 of approximately 80 degrees while the radial flange 20 relative to the radial flange 17 has a greater circumferential spacing 26 of approximately 100 degrees. The arrangement is such that the greater circumferential spacings 26 are cut in half by the longitudinal center axis 28 of the support plate or by the y axis of a theoretical coordinate system. In the illustrated embodiment, the y axis coincides with the longitudinal center axis 28 of the support plate 8.

The radial flanges 17, 18, 19, 20 are radially projecting, as shown in FIGS. 1 and 3, past the outer diameter A of the coil 2 wherein in at least one head section 23 of a radial flange a clamping opening 27 or 29 for an end section 30 of the trimmer line 22 is formed. In FIGS. 1 and 7, it is schematically indicated that the end section 30 of a trimmer line 22 can be secured in such a clamping opening 27 or 29.

In the illustrated embodiment, in each of the head sections 23 of a radial flange 17, 18, 19, 20 a clamping opening 27 or 29 is provided wherein in each head section 23 preferably several damping openings are provided, in particular several clamping opening 27, 29 for trimmer lines 22 with different line diameter D.

In each radial flange 17, 18, 19, 20 there is formed moreover a penetration 31 which extends from the base section 24 to below the head section 23 and has a contour that corresponds advantageously to the outer contour of the radial flanges 17, 18, 19, 20.

As shown in particular in FIGS. 2 to 5, in the support plate 8 cutouts 32 and 34 are provided which, in a view from the front (FIG. 3) or in a view from behind (FIG. 5), are positioned spatially at the level of the radial flanges 17, 18, 19, 20, i.e., in the views of FIGS. 3 and 5, they are overlapping each other. The cutouts 32 of the support plate 8 that are positioned below the x axis have an inner contour 35 which corresponds approximately to the outer contour of the respective radial flanges 17 and 20. The surface area of the cutouts 32 is greater than the surface area of the radial flanges 17 and 20 wherein relative to the inner contour 35 a spacing a is provided. In the view from the front (FIG. 3) and in the view from the rear (FIG. 5) the radial flanges 17 and 20 are positioned above the cutouts 32.

The cutouts 34 above the x axis of the imaginary coordinate system are trapezoidally shaped in the area of the head sections 23 of the radial flanges 18 and 19. The cutouts 34 corresponds otherwise substantially to the shape of the cutouts 32 with the corresponding spacing a of the radial flanges 18 and 19 relative to the inner contour 35.

As shown in FIG. 7, in the area of the end 7 of the coil core 3 a further window 33 is provided which exposes the rim of the end 7 relative to the support plate 8. In this rim 36 a clamping element 38 for securing an inner end section 40 of the trimmer line 22 is provided in the wall surface 37 of the coil core 3. In the illustrated embodiment, the clamping element 38 is designed as an axial clamping tongue 39 whose free end is positioned in the window 33 of the support plate 8.

The cutouts 32 and 34 and the window 33 in the support plate 8 adjoin immediately the wall surface 37 of the coil core 3. In this context, as described above, the cutouts 32, 34 in the support plate 8 and the radial flanges 17, 18, 19, 20 at the end 6 of the coil core 3 are positioned in the same circumferential position on the coil core 3. Each radial flange 17, 18, 19, 20 has a head section 23 and a base section 24 wherein the base section 24 begins at the level of the wall surface 37 of the coil core 3. In the circumferential direction, the penetrations 32 and 34 each have a greater extension than the radial flanges 17, 18, 19, 20. Accordingly, the penetrations 32 and 34 in the base area have a width F measured in the circumferential direction that is greater than the width f of the base section of a radial flange. In the head area the penetrations 32 and 34 have a width K measured in the circumferential direction that is greater than the width k of the head section of a radial flange. This configuration enables a monolithic manufacture of the coil support 1, for example, of plastic material, in a mold, for example, an injection mold.

In a special embodiment of the invention, the coil core 3, the support plate 8 and the securing elements, i.e., the radial flanges 17, 18, 19, 20, are formed as a monolithic component, in particular of plastic material. The monolithic component of support plate, coil core, and securing elements can be pushed onto a drive spindle 41 since the coil core 3 is hollow wherein the coil core 3 has an inner follower 42 that is radially projecting inwardly. The follower 42 is expediently formed as a rib 43 that is extending in the direction of the longitudinal center axis 9 of the coil core 3 which engages a follower groove of the drive spindle 41 formed as a longitudinal groove. The follower groove 44 and the rib 43 act as a key coupling.

For furnishing the coil support 3 with a coil 2 of a trimmer line 22 for a trimmer, the coil support 3 is pushed onto the free end of the drive spindle 41 and is driven in rotation about longitudinal axis 9 of the coil core 3. Before beginning the rotation, the trimmer line 22 is secured on the clamping element 38, as illustrated schematically in FIG. 7. As the rotation begins, the trimmer line 22 is wound onto the wall surface 37 of the coil core 3 wherein guiding of the trimmer line 22 is done such that the trimmer line 22 is uniformly wound layer by layer. When the desired outer diameter A of the coil 2 has been reached, the trimmer line 22 is cut off and, as illustrated for example in FIG. 1, is fixedly secured in a clamping opening 27 or 29 of a radial flange 17 to 20. It can be expedient to secure the coil member 2 by a shrink film so that unwinding during transport of the trimmer line coil on the coil support 3 is prevented reliably.

For accessing the coil, the user removes the optionally provided shrink film and unwinds the trimmer line 22 to a length that he needs. After cutting to length the trimmer line, the remaining end section 30 is fixed again in one of the clamping openings 27 or 29 of the radial flanges so that an automatic unwinding of the trimmer line is reliably excluded.

For stiffening the support plate 8, as illustrated in FIG. 5, reinforcement webs 45 can be provided that extend between the outer rim 21 of the support plate 8 at the backside of the support plate 8.

What is claimed is:

1. A coil support with a coil of a trimmer line for a trimmer, the coil support provided with a longitudinal coil support center axis and comprising:

a coil core having a core center axis and comprising an outer core wall surface, wherein the coil core is a hollow coil cylinder and comprises a rotational drive follower;

the coil of the trimmer line wound onto the outer core wall surface and having an inner end section of the trimmer line and an outer end section of the trimmer line, wherein the coil support is driven in rotation about the core center axis of the coil core via the rotational drive follower for winding the coil of the trimmer line onto the outer core wall surface;

the coil core having a first axial end and a second axial end;

a first securing element connected to the first axial end and second securing elements connected to the second axial end, wherein the first and second securing elements provide positional fixation of the coil of the trimmer line wound onto the outer core wall surface of the coil core, wherein the first and second securing elements project radially past the outer core wall surface of the coil core;

wherein the first securing element is a support plate that defines a support plate plane, wherein the support plate plane is arranged in an x-y plane of a three dimensional coordinate system, wherein the y axis of the three dimensional coordinate system is defined by the longitudinal coil support center axis and wherein the z axis of the three dimensional coordinate system is defined by the core center axis of the coil core;

wherein the support plate has an extension measured in a direction of the y axis and a width measured in a direction of the x axis of the three dimensional coordinate system, wherein the extension is greater than the width, and wherein the extension is comprised of a first portion measured above the x axis and a second portion measured below the x axis, wherein the first portion above the x axis is larger than the second portion;

wherein the coil core is connected fixedly with the support plate and with the second securing elements;

wherein the coil core, the support plate, and the second securing elements form a monolithic component of plastic material.

2. The coil support according to claim 1, wherein the second securing elements are radial flanges that each have a head section and a base section and the base section begins at a level of the outer core wall surface of the coil core.

3. The coil support according to claim 1, wherein the second securing elements are radial flanges and wherein at least one of the radial flanges has a head section and a base section and a clamping opening for the outer end section of the trimmer line is formed in the head section.

4. The coil support according to claim 3, wherein the head section has several of said clamping opening for trimmer lines with different line diameter.

5. The coil support according to claim 1, wherein the outer core wall surface of the coil core has a clamping element for securing the inner end section of the trimmer line.

6. The coil support according to claim 5, wherein the clamping element is a clamping tongue formed in the outer core wall surface of the coil core.

7. The coil support according to claim 6, wherein the clamping tongue has a free end and the free end of the clamping tongue ends in a window of the support plate.

8. The coil support according to claim 1, wherein the support plate has cutouts that adjoin immediately the outer core wall surface of the coil core.

9. The coil support according to claim 1, wherein the rotational drive follower projects in a radial direction inwardly.

10. The coil support according to claim 9, wherein the rotational drive follower is a rib.

11. The coil support according to claim 10, wherein the rib is axially extending in a direction of the core center axis of the coil core.

12. The coil support according to claim 10, wherein the rib is configured to engage a follower groove of a drive spindle when the coil support is driven in rotation for winding the coil of the trimmer line onto the outer core wall surface.

13. The coil support according to claim 1, wherein the support plate comprises a receiving field for an adhesive label or a labeling.

14. The coil support according to claim 1, wherein the support plate has an opening adapted to engage a suspending element, wherein the opening extends on both sides of the longitudinal axis of the support plate.

15. The coil support according to claim 1, wherein the monolithic component is an injection-molded plastic component.

16. The coil support according to claim 1, wherein the first portion above the x axis is more than 1.5 times as large as the second portion.

17. A coil support with a coil of a trimmer line for a trimmer, the coil support provided with a longitudinal coil support center axis and comprising:

a coil core having a core center axis and comprising an outer core wall surface;

the coil of the trimmer line wound onto the outer core wall surface and having an inner end section of the trimmer line and an outer end section of the trimmer line;

the coil core having a first axial end and a second axial end;

a first securing element connected to the first axial end and second securing elements connected to the second axial end, wherein the first and second securing elements provide positional fixation of the coil of the trimmer line wound onto the outer core wall surface of the coil core, wherein the first and second securing elements project radially past the outer core wall surface of the coil core;

wherein the first securing element is a support plate that defines a support plate plane, wherein the support plate plane is arranged in an x-y plane of a three dimensional coordinate system, wherein the y axis of the three dimensional coordinate system is defined by the longitudinal coil support center axis and wherein the z axis of the three dimensional coordinate system is defined by the core center axis of the coil core;

wherein the support plate has an extension measured in a direction of the y axis and a width measured in a direction of the x axis of the three dimensional coordinate system, wherein the extension is greater than the width, and wherein the extension is comprised of a first portion measured above the x axis and a second portion measured below the x axis, wherein the first portion above the x axis is larger than the second portion;

wherein the coil core is connected fixedly with the support plate and with the second securing elements;

wherein the coil core, the support plate, and the second securing elements form a monolithic component of plastic material;

wherein the coil has an outer coil diameter, wherein the second securing elements are radial flanges that are connected with a base section to an outer core wall of the coil core and project radially outwardly past the outer diameter of the coil of the trimmer line, and wherein the base sections of the radial flanges, in a circumferential direction of the coil core, are spaced apart from each other at the outer core wall of the coil core.

18. The coil support according to claim 17, wherein the radial flanges each have a penetration.

19. A coil support with a coil of a trimmer line for a trimmer, the coil support provided with a longitudinal coil support center axis and comprising:

a coil core having a core center axis and comprising an outer core wall surface;

the coil of the trimmer line wound onto the outer core wall surface and having an inner end section of the trimmer line and an outer end section of the trimmer line;

the coil core having a first axial end and a second axial end;

a first securing element connected to the first axial end and second securing elements connected to the second axial end, wherein the first and second securing elements provide positional fixation of the coil of the trimmer line wound onto the outer core wall surface of the coil core, wherein the first and second securing elements project radially past the outer core wall surface of the coil core;

wherein the first securing element is a support plate that defines a support plate plane, wherein the support plate plane is arranged in an x-y plane of a three dimensional coordinate system, wherein the y axis of the three dimensional coordinate system is defined by the longitudinal coil support center axis and wherein the z axis of the three dimensional coordinate system is defined by the core center axis of the coil core;

wherein the support plate has an extension measured in a direction of the y axis and a width measured in a direction of the x axis of the three dimensional coordinate system, wherein the extension is greater than the width, and wherein the extension is comprised of a first portion measured above the x axis and a second portion measured below the x axis, wherein the first portion above the x axis is larger than the second portion;

wherein the coil core is connected fixedly with the support plate and with the second securing elements;

wherein the coil core, the support plate, and the second securing elements form a monolithic component of plastic material;

wherein the coil has an outer coil diameter, wherein the second securing elements are radial flanges that project past the outer diameter of the coil of the trimmer line;

wherein the support plate has radially outwardly extending cutouts that adjoin immediately the outer core wall surface of the coil core;

wherein the radial flanges are connected with a base section to an outer core wall of the coil core and project radially outwardly from the outer core wall, wherein the base sections are spaced apart from each other in a circumferential direction of the coil core, wherein the cutouts of the support plate and the radial flanges are arranged at identical circumferential positions on the coil core, respectively.

20. The coil support according to claim 19, wherein the cutouts in the circumferential direction of the coil core have a greater extension than the radial flanges.

21. The coil support according to claim 19, wherein, viewed in an axial direction of the coil core, the radial flanges are positioned above the cutouts of the support plate.

\* \* \* \* \*